United States Patent
Deal (10) Patent No.: US 8,960,252 B2
(45) Date of Patent: Feb. 24, 2015

(54) TIRE WITH RADIAL CARCASS REINFORCEMENT

(75) Inventor: Michel Deal, St.-Remy-En-Rollat (FR)

(73) Assignees: Michelin Recherche et Technique S.A., Granges Paccot (CH); Compagnie Generale des Etablissements Michelin, Clermont-Ferrand (FR)

(*) Notice: Subject to any disclaimer, the term of this patent is extended or adjusted under 35 U.S.C. 154(b) by 103 days.

(21) Appl. No.: 13/263,965

(22) PCT Filed: Apr. 6, 2010

(86) PCT No.: PCT/EP2010/054482
§ 371 (c)(1),
(2), (4) Date: Jan. 4, 2012

(87) PCT Pub. No.: WO2010/115860
PCT Pub. Date: Oct. 14, 2010

(65) Prior Publication Data
US 2012/0090755 A1    Apr. 19, 2012

(30) Foreign Application Priority Data
Apr. 9, 2009    (FR) ..................... 09 52355

(51) Int. Cl.
*B60C 9/18*    (2006.01)
*B60C 9/20*    (2006.01)
*B60C 1/00*    (2006.01)

(52) U.S. Cl.
CPC .... *B60C 9/18* (2013.01); *B60C 9/20* (2013.01)
USPC ........... 152/526; 152/527; 152/531; 152/535; 152/537

(58) Field of Classification Search
USPC .......................................... 152/526–538, 451
IPC ........................................ B60C 9/18, 9/20, 9/22
See application file for complete search history.

(56) References Cited

U.S. PATENT DOCUMENTS

| | | | |
|---|---|---|---|
| 3,166,113 A * | 1/1965 | Keefe, Jr. ...................... | 152/533 |
| 3,177,277 A * | 4/1965 | Adams et al. ................ | 264/210.7 |
| 3,667,529 A * | 6/1972 | Mirtain .......................... | 152/527 |
| 3,785,423 A * | 1/1974 | de Carbon .................... | 152/527 |
| 4,691,752 A * | 9/1987 | Kabe et al. ..................... | 152/527 |
| 5,417,266 A | 5/1995 | Janus | |

(Continued)

FOREIGN PATENT DOCUMENTS

| | | | | |
|---|---|---|---|---|
| EP | 1 837 205 | | 9/2007 | |
| GB | 720150 A | * | 12/1954 | ............... B60C 9/06 |

(Continued)

OTHER PUBLICATIONS

Machine Translation: JP11-170808; Koishi, Masataka; (no date).*

*Primary Examiner* — Justin Fischer
*Assistant Examiner* — Kendra Shin
(74) *Attorney, Agent, or Firm* — Cozen O'Connor (57) ABSTRACT

A passenger vehicle tire, the crown reinforcement of which has three distinct elements, the three distinct elements comprising: a radial carcass reinforcement formed of reinforcing elements connecting the two beads of the tire, a crown belt comprising reinforcing elements parallel to the circumferential direction of the tire, and a crown triangulation layer comprising reinforcing elements making an angle of between 10 degrees and 80 degrees with the circumferential direction of the tire, the reinforcing elements of the triangulation layer having a flattened cross section.

20 Claims, 4 Drawing Sheets

(56) References Cited

U.S. PATENT DOCUMENTS

| | | | |
|---|---|---|---|
| 5,746,853 A * | 5/1998 | Burlacot | 152/531 |
| 5,837,077 A | 11/1998 | Kabe et al. | |
| 6,029,725 A | 2/2000 | Mani | |
| 6,568,445 B1 * | 5/2003 | Kojima | 152/526 |
| 6,619,357 B1 * | 9/2003 | Gillard et al. | 152/531 |
| 2002/0189736 A1 * | 12/2002 | Sinopoli et al. | 152/527 |
| 2007/0169867 A1 * | 7/2007 | Esnault et al. | 152/340.1 |
| 2009/0211685 A1 * | 8/2009 | Kabe et al. | 152/531 |

FOREIGN PATENT DOCUMENTS

| | | | |
|---|---|---|---|
| JP | 11170808 A * | 6/1999 | B60C 9/18 |
| WO | WO 92/12019 | 7/1992 | |

* cited by examiner

TIRE WITH RADIAL CARCASS REINFORCEMENT

RELATED APPLICATIONS

This is a U.S. national stage under 35 U.S.C. §371 of International Application No. PCT/EP2010/054482, filed on Apr. 6, 2010, which claims priority on French patent application No. 09/52355, filed on Apr. 9, 2009, the entire content of which is hereby incorporated by reference.

FIELD OF THE INVENTION

The present invention relates to tires, and more particularly to tires with a radial carcass.

BACKGROUND OF THE INVENTION

Tires with a radial carcass, commonly known as "radial tires" are gradually becoming the norm in most markets, particularly in the passenger vehicle tire market. This success is due in particular to the durability, comfort, lightness and low rolling resistance that radial tire technology enjoys.

The radial tire is essentially made up of flexible sidewalls and of a more rigid crown, the sidewalls extending radially from the beads as far as the shoulders, the shoulders between them delimiting the crown, the crown supporting the tread strip of the tire. Because each of these parts of the tire has its own specific functions, it also has its own special reinforcement. One feature of radial tire technology is that the reinforcement of each of these parts can be precisely adapted relatively independently of each other.

The crown reinforcement of a passenger vehicle radial tire (commonly known as a "passenger car tire") comprises, in the known way, the following elements:
- a radial carcass reinforcement formed of reinforcing elements (generally textile) connecting the two beads of the tire,
- two crossed crown triangulation layers (or plies) essentially consisting of reinforcing elements (generally metal) each forming an angle of about 30° with the circumferential direction of the tire,
- a crown belt essentially consisting of reinforcing elements practically parallel to the circumferential direction of the tire, often known as 0° reinforcing elements even though in general they make a non-zero angle with the circumferential direction, for example an angle of between 0 and 10°.

In broad terms, the carcass can be said to have the prime function of containing the internal pressure of the tire, that the crossed plies have the prime function of giving the tire its cornering stiffness and that the crown belt has the prime function of resisting centrifugal effects on the crown at high speed. Further, interaction between all these reinforcement elements creates what is known as the crown triangulation. It is this triangulation that gives the carcass its ability to retain a relatively cylindrical shape in the face of the various stress loadings.

Each of these elements of the crown reinforcement is generally combined by calendering with rubber compounds. The stack of these elements is then joined together during the vulcanising of the tire.

After several decades of research, progress and development of radial tire architecture, it is the combination of all these reinforcement elements (carcass, crossed layers, belt) that allows the radial tire to achieve the undeniable comfort, long life and cost performance that has made it the success it is. Throughout this development, attempts have been made to improve the performance of the tires, for example in terms of their mass and their rolling resistance. Thus the crown of radial tires has gradually reduced in thickness as increasingly high-performance reinforcing elements have been adopted and increasingly thinner layers of calendering rubber have been used so that tires that are as light as possible can be manufactured.

SUMMARY OF THE INVENTION

It is one objective of the invention to allow a significant further reduction in the mass of the crown and therefore the tires for passenger vehicles, without thereby reducing their performance.

This objective is achieved according to one aspect of the invention directed to a passenger vehicle tire, the crown reinforcement of which consists of three distinct elements, the said three distinct elements comprising:
- a radial carcass reinforcement formed of reinforcing elements connecting the two beads of the tire,
- a crown belt essentially consisting of reinforcing elements parallel to the circumferential direction of the tire, and
- a crown triangulation layer essentially consisting of reinforcing elements making an angle of between 10 degrees and 80 degrees with the circumferential direction of the tire, the said reinforcing elements of the triangulation layer having a flattened cross section.

For preference, the reinforcing elements of flattened cross section of the triangulation layer are made of polymer, more preferably still, a thermoplastic polymer film.

For preference, the thermoplastic polymer film is a polyethylene terephthalate (PET) film that has undergone multi axis stretching.

According to a first alternative of the invention, the crown triangulation layer is situated radially on the outside of the crown belt.

According to a second alternative of the invention, the crown triangulation layer is situated radially on the inside of the crown belt.

For preference, the reinforcing elements of the crown belt have a tensile modulus higher than 25 GPa. More preferably still, these reinforcing elements contain steel or aramid.

For preference, the reinforcing elements of flattened cross section of the triangulation layer have a tensile modulus greater than 1 GPa.

According to one alternative of the invention, the spacing between two reinforcing elements of flattened cross section in the triangulation layer is greater than sum of their half-widths, the spacing being measured in a direction transverse to the reinforcing elements.

According to another alternative of the invention, the spacing between two reinforcing elements of flattened cross section of the triangulation layer is less than the sum of their half-widths, the spacing being measured in a direction transverse to the reinforcing elements. For preference also, the spacing is less than the sum of their half-widths by a value equal to at least four times the maximum thickness of the reinforcing elements of flattened cross section.

For preference, the width of the reinforcing elements of flattened cross section of the triangulation layer is at least equal to 5 times their maximum thickness and preferably at least equal to 20 times their maximum thickness.

According to one preferred embodiment of the invention, the triangulation layer essentially consists of reinforcing elements making an angle of between 25 degrees and 60 degrees with the circumferential direction of the tire.

DETAILED DESCRIPTION OF THE DRAWINGS

Figure 1:
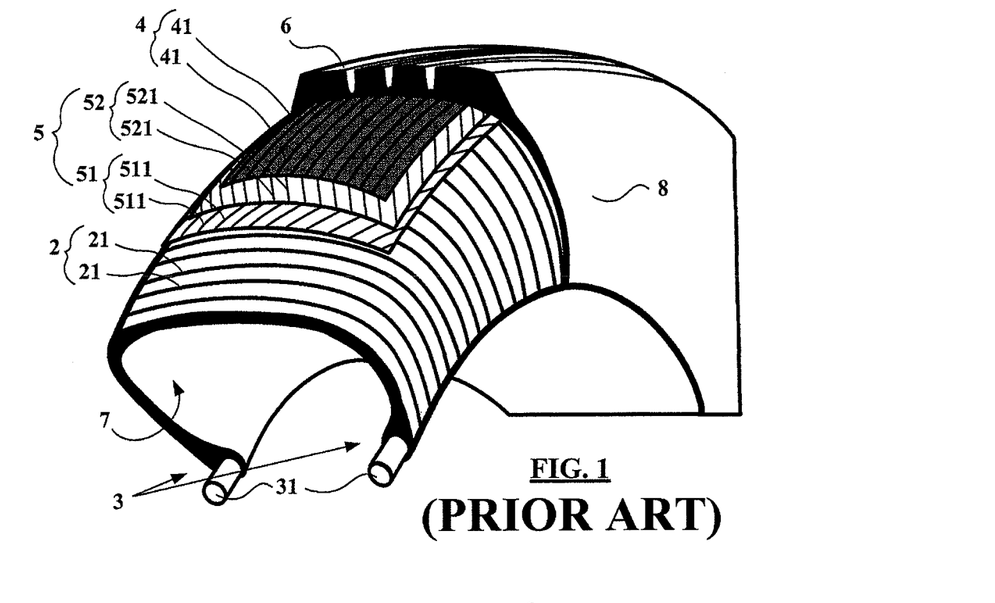
FIG. 1 is a view with cutaway schematically showing the architecture of a tire according to the prior art.

FIG. 1 schematically depicts, in a view with cutaway, a radial tire for a passenger vehicle according to the prior art. Its carcass reinforcement 2 which connects the two beads 3 formed around bead wires 31 may be seen. The carcass reinforcement is formed of radially oriented reinforcing elements 21. The reinforcing elements 21 are textile cords (for example made of nylon, rayon or polyester). The carcass constitutes the single reinforcement of the sidewalls 8, whereas in the crown, that is to say between the two shoulders of the tire, the carcass is surmounted by two crossed triangulation layers 51 and 52 and by a belt 4.

The two crossed crown triangulation layers 51 and 52 comprise reinforcing elements (511 and 521 respectively) directed at an angle generally of between 20° and 40° on each side of the circumferential direction of the tire. The reinforcing elements in the crossed layers are essentially metal cords.

The crown belt 4 essentially consists of reinforcing elements directed parallel to the circumferential direction of the tire (also known as "0° reinforcing elements"). These reinforcing elements are generally metal cords, textile cords (for example made of nylon, rayon, polyester, aramid) or hybrid cords.

A layer of inner lining rubber 7 covers the cavity of the tire and a tread strip 6 caps the crown reinforcement.

Figure 2:
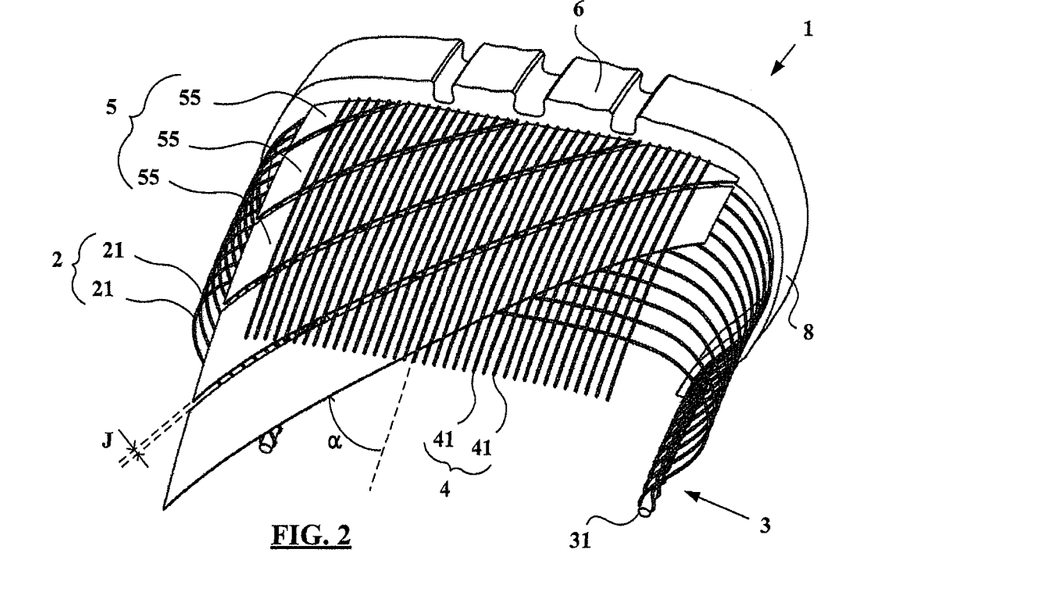
FIG. 2 is a view with cutaway showing the architecture of a tire according to a first embodiment of the invention.

FIG. 2 depicts a first embodiment of a tire according to the invention.

The crown reinforcement of the tire according to the invention comprises a radial carcass 2 and a circumferential belt 4 which are similar to those which have been described in respect of the tire of the prior art. By contrast, the two crossed layers 51 and 52 of the prior art are replaced by a single triangulation layer 5.

The reinforcing elements 55 in the triangulation layer 5 have a cross section of flattened shape and are inclined by an angle "α" with respect to the circumferential direction of the tire. In the example of FIG. 2, the angle α is 45°. The width of the flat reinforcing elements 55 is around 30 mm in this instance. The spacing at which the reinforcing elements 55 are laid, measured in the transverse direction of the reinforcing elements, in this instance is greater than the sum of the half-widths of the reinforcing elements which means that the flat reinforcing elements are juxtaposed with no overlap. A clearance "J" of the order of 1 to 2 mm is present between the reinforcing elements. The clearance may be substantially constant across the entire width of the crown if, as is the case in this example, the triangulation strips 55 have a width that reduces slightly near the shoulders. By contrast, if the strips are of constant width, the clearance will be greater at the middle of the crown than near the shoulders because of the curvature of the crown.

Surprisingly, such a tire is able to attain cornering stiffness performance comparable to that obtained with tires of the state of the art even though the thickness and mass of the tire may be very appreciably less.

Figure 3:
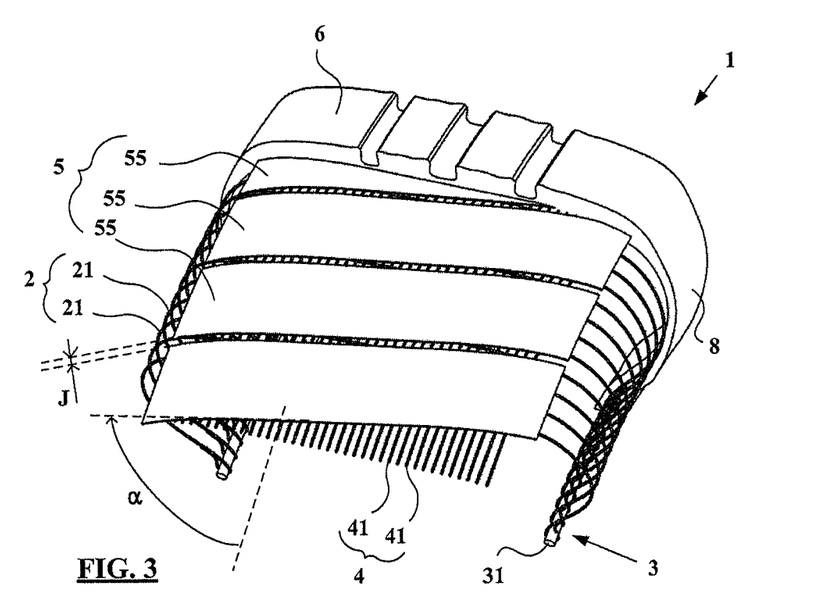
FIG. 3 is a view with cutaway showing the architecture of a tire according to a second embodiment of the invention.

FIG. 3 shows another embodiment of the invention in which the layer 5 of flat reinforcing elements 55 is positioned this time on top of the belt 4. One advantage of this arrangement is that the layer 5 also protects the belt and the carcass against attack (puncturing, cuts).

In FIG. 3 it can also be seen that the flat reinforcing elements are markedly more inclined with respect to the circumferential direction of the tire. The angle α in this instance is 80° and the clearance "J" is similar to that of FIG. 2. The width of the strips 55 is around 35 mm. Naturally, it is also possible to combine the crown element layout as described in FIG. 2 with the angle of inclination illustrated in the present FIG. 3, and vice versa.

Figures 4, 5:
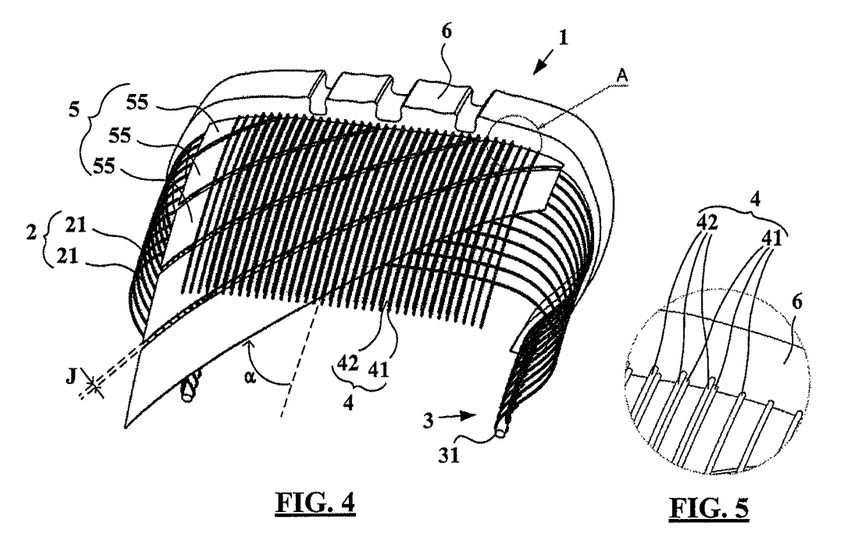
FIG. 4 is a view with cutaway showing the architecture of a tire according to a third embodiment of the invention.
FIG. 5 is a view of detail A of FIG. 4.

FIG. 4 depicts an alternative of the embodiment of FIG. 2, in which the circumferential belt 4 in its central part has a doubling of the number of circumferential reinforcing elements. Reinforcing elements 42 are added to the reinforcing elements 41 in this central part. If the reinforcing elements are laid individually or in strips, it will be appreciated that all that is required for example is for additional terms to be laid in the central part or for the laying pitch in this part to be reduced. Detail A depicted in FIG. 5 gives better insight into the principle of this variant.

Figure 6:
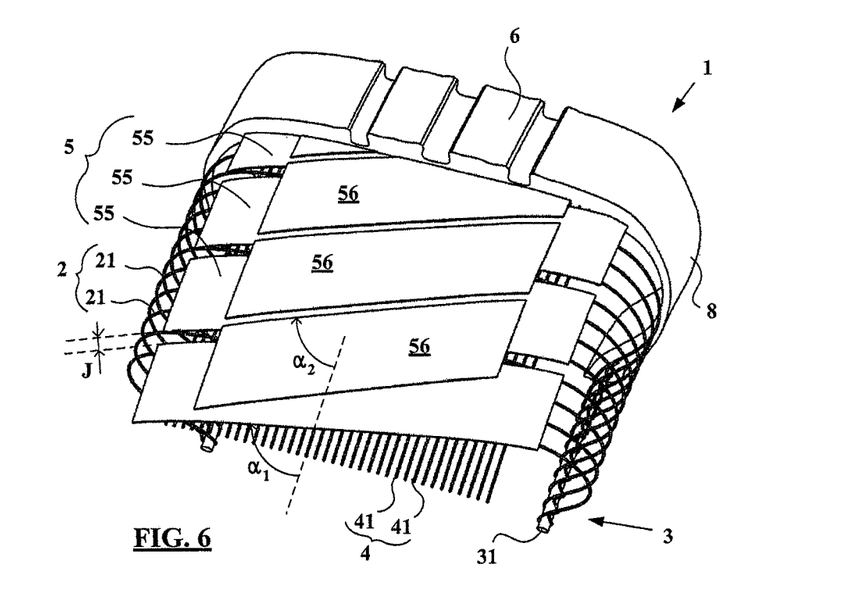
FIG. 6 is a view with cutaway showing the architecture of a tire according to a fourth embodiment of the invention.

FIG. 6 depicts another embodiment of the invention in which the triangulation layer comprises two series of superposed flat reinforcing elements 55 and 56, with different lengths and orientations. The strips 55 are at an angle $\alpha_1$ of 80° and the strips 56 are at an angle $\alpha_2$ of 70°. The reinforcing elements 56 cover the clearances between the reinforcing elements 55.

Figure 7:
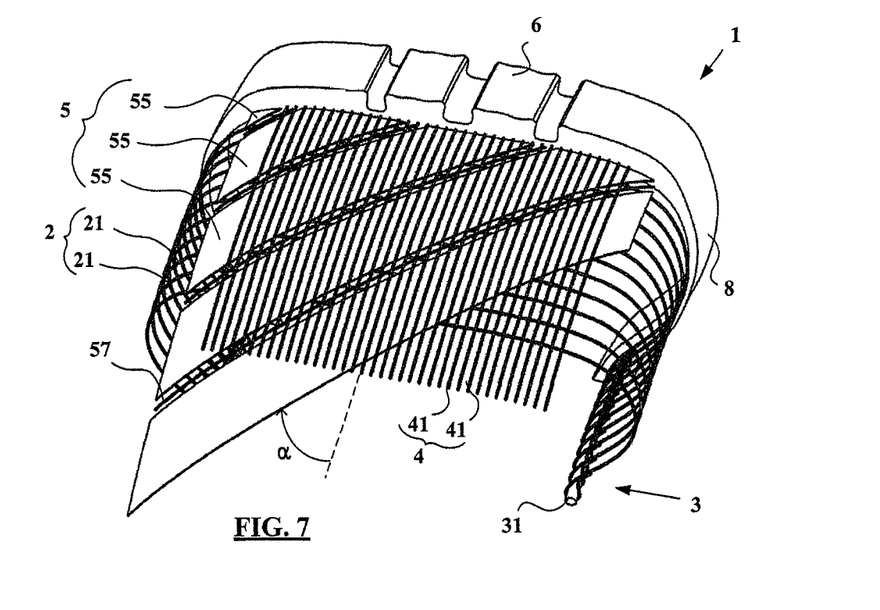
FIG. 7 is a view with cutaway showing the architecture of a tire according to a fifth embodiment of the invention.

FIG. 7 depicts another embodiment of the invention in which the triangulation layer 5 additionally comprises cords 57 interposed between the flat reinforcing elements 55. These cords may, for example, be similar to the carcass cords or belt cords. One advantage of having these cords 57 present is that they make it easier for gases to be extracted during vulcanisation. They are also able to perform part of the triangulation layer reinforcing function.

Figure 8:
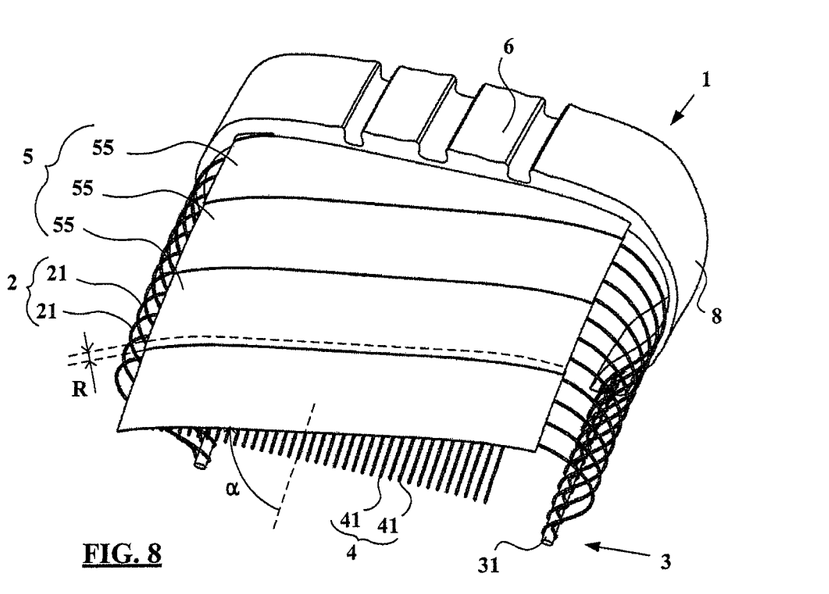
FIG. 8 is a view with cutaway showing the architecture of a tire according to a sixth embodiment of the invention.

FIG. 8 depicts another embodiment of the invention, in which the flat reinforcing elements 55 of the triangulation layer 5 partially overlap one another to define an overlap "R" of the order of 2 to 3 mm in this example. The width of the reinforcing elements is around 40 mm. The spacing at which the flat reinforcing elements are laid, measured in their transverse direction, is therefore in this instance less than the sum of the half-widths of the reinforcing elements. For preference, the overlap is greater than twice the maximum thickness of the reinforcing element 55.

Figure 9:
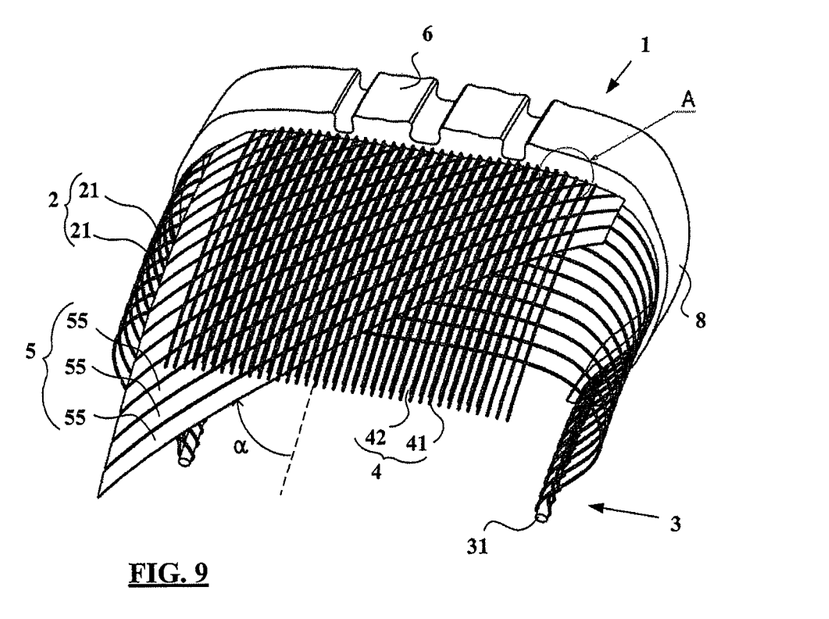
FIG. 9 is a view with cutaway showing the architecture of a tire according to a seventh embodiment of the invention.

FIG. 9 shows an alternative form of the embodiment of FIGS. 4 and 5, in which the width of the flat reinforcing elements 55 is reduced to around 10 mm and the clearance "J" is around 1 mm.

One advantageous feature of the tire according to the invention is that the air tightness of the crown is enhanced by the presence of the flat reinforcing elements. The thickness of the inner liner (not depicted in FIGS. 2 to 9) may be appreciably reduced under the crown. This feature therefore makes it possible to further reduce the thickness and total mass of the crown.

The flat reinforcing elements may be metal reinforcing elements, composite reinforcing elements or polymer reinforcing elements.

For preference, the flat reinforcing elements are made of polymer, more preferably still, of thermoplastic polymer. For example, a thermoplastic polymer film that has undergone multi axis stretching, that is to say that has been stretched and oriented in more than one direction, may be used. Such films that have undergone multi axis stretching are well known, and essentially used these days in the packaging industry, the foodstuffs industry, the electrical field, or even as backings for magnetic coatings.

They are prepared using various well known stretching techniques, all intended to give the film good mechanical properties in several main directions rather than in just one direction as is the case for conventional thermoplastic polymer fibres (for example PET or nylon fibres) which, in the known way, undergo mono axial stretching when spun in the molten state.

Such techniques call upon multiple stretching operations in several directions, the stretchings being longitudinal, transverse, planar; by way of example, mention may notably be made of the technique of stretch blow-moulding in two directions.

Thermoplastic polymer films that have undergone multi axis stretching and methods of obtaining them are described in numerous patent documents, for example documents FR 2539349 (or GB 2134442), DE 3621205, EP 229346 (or U.S. Pat. No. 4,876,137), EP 279611 (or U.S. Pat. No. 4,867,937), EP 539302 (or U.S. Pat. No. 5,409,657) and WO 2005/011978 (or US 2007/0031691).

The stretching operations may be performed in one or several stages, it being possible for the stretching operations when there are several of them to be either simultaneous or in sequence; the stretch rate or rates applied depending on the target final mechanical properties, generally being greater than 2.

For preference, the thermoplastic polymer film used has, whatever the direction of traction considered, a tensile modulus denoted E which is greater than 500 MPa (notably between 500 and 4000 MPa), more preferably greater than 1000 MPa (notably between 1000 and 4000 MPa), more preferably still, greater than 2000 MPa. E modulus values of between 2000 and 4000 MPa, particularly between 3000 and 4000 MPa are particularly desirable as crown triangulation layers according to the invention.

According to another preferred embodiment, whatever the direction of tension considered, the maximum tensile stress, denoted $\sigma_{max}$, in the thermoplastic polymer film is preferably greater than 80 MPa (notably between 800 and 200 MPa) more preferably greater than 100 MPa (notably between 100 and 200 MPa). Stress values $\sigma_{max}$ in excess of 150 MPa, particularly those comprised between 150 and 200 MPa, are particularly desirable.

According to another preferred embodiment, whatever the direction of tension considered, the plastic deformation threshold denoted Yp (also known as the "yield point") of the thermoplastic polymer film is situated beyond 3% elongation, notably between 3 and 15%. Yp values beyond 4%, particularly those comprised between 4 and 12%, are particularly desirable.

According to another preferred embodiment, whatever the direction of tension considered, the thermoplastic polymer film has an elongation at break denoted Ar which is greater than 40% (notably between 40 and 200%), more preferably greater than 50%. Ar values comprised between 50 and 200% are particularly desirable.

The abovementioned mechanical properties are well known to those skilled in the art, and are deduced from the force-elongation curves, measured for example in accordance with the standard ASTM F 638-02 for strips of thickness greater than 1 mm, or alternatively in accordance with the standard ASTM D882-09 for thin sheets or films of a thickness of 1 mm at most; the above values for the modulus E and stress $\sigma_{max}$, expressed in MPa, are calculated with respect to the initial cross section of the tensile test specimen.

The thermoplastic polymer film used is preferably of the thermally stabilized type which means that after stretching it has undergone one or more heat treatments aimed in the known way at limiting its high-temperature thermal contraction (or shrinkage); such heat treatments may notably consist of annealing or tempering operations or combinations of such annealing or tempering operations.

Thus, and for preference, the thermoplastic polymer film used has, after 30 min at 150° C., a relative contraction of its length which is less than 5%, preferably less than 3% (measured in accordance with ASTM D1204).

The melting point ("Tf") of the thermoplastic polymer used is preferably chosen to be above 100° C., more preferably above 150° C., particularly above 200° C.

The thermoplastic polymer is preferably chosen from the group consisting of polyamides, polyesters and polyimides, more particularly from the group consisting of polyamides and polyesters. In the polyamides group, particular mention may be made of the polyamides nylon 4-6, nylon-6, nylon 6-6, nylon-11 or nylon-12. In the polyesters group, mention may be made for example of PET (polyethylene terephthlate), PEN (polyethylene naphthalate), PBT (polybutylene terephthalate), PBN (polybutylene naphthalate), PPT (polypropylene terephthalate), PPN (polypropylene naphthalate).

The thermoplastic polymer is preferably a polyester, more preferably a PET or a PEN.

Examples of PET thermoplastic polymer films that have undergone multi axis stretching, suitable for the crown triangulation layer of the invention are, for example, PET films that have undergone two-directional stretching marketed under the names "Mylar" and "Melinex" (by DuPont Teijin Films), or alternatively "Hostaphan" (by Mitsubishi Polyester Film).

In the crown triangulation layer of the invention, the thickness of the thermoplastic polymer film is preferably comprised between 0.05 et 1 mm, more preferably between 0.1 and 0.7 mm. For example, film thicknesses of 0.20 to 0.60 mm have proved to be entirely suitable.

The thermoplastic polymer film may contain additives added to the polymer, notably at the time of forming thereof, it being possible for these additives for example to be agents affording protection against ageing, plasticisers, fillers such as silica, clays, talc, kaolin or even short fibres; fillers may, for example, make the surface of the film rough and thus contribute to improving the way it holds adhesive and/or adheres to the layers of rubber with which it is intended to be in contact.

According to one preferred embodiment of the invention, the thermoplastic polymer film is provided with a layer of adhesive facing each layer of rubber composition with which it is in contact.

In order to cause the rubber to adhere to the thermoplastic polymer film, it is possible to use any appropriate adhesive system, for example a simple textile adhesive of the RFL (resorcinol-formaldehyde-latex) type containing at least one diene elastomer such as natural rubber, or any equivalent adhesive known to provide satisfactory adhesion between rubber and conventional thermoplastic fibres such as polyester or polyamide fibres.

By way of example, the adhesive-coating process may essentially include the following successive steps: passage through a bath of adhesive, followed by an operation of centrifuging (for example by blowing, grading) to remove the excess adhesive; then drying, for example by passage through an oven (for example for 30 s at 180° C.) finally followed by heat treatment (for example for 30 s at 230° C.).

Before the above application of adhesive, it may be advantageous to activate the surface of the film, for example using a mechanical and/or physical and/or chemical route, to improve its holding of adhesive and/or its final adhesion to the rubber. A mechanical treatment might for example consist in a prior step of delustering or scratching the surface; a physical treatment could for example consist of a treatment with radiation such as an electron beam; a chemical treatment might, for example, consist of a prior passage through a bath of epoxy resin and/or of isocyanate compound.

Because the surface of the thermoplastic polymer film is, as a general rule, particularly smooth, it may also be advantageous to add a thickening agent to the adhesive used, in order to improve the overall holding of the adhesive by the film as it is being coated with adhesive.

The person skilled in the art will readily understand that the connection between the thermoplastic polymer film and each layer or rubber with which it is in contact is afforded definitively at the time of the final curing (cross-linking) of the tire.

In the tire according to the invention, the circumferential reinforcing elements (41, 42) in the belt are preferably relatively rigid, their elastic modulus preferably being comprised between 25 and 250 GPa, preferably between 40 GPa and 250 GPa.

Examples of circumferential reinforcing elements that can be used include carbon steel or stainless steel cords, textile cords made up of fibres twisted together, particularly cords known for their dimensional stability in relation to temperature and/or moisture. The textile fibres of these cords are, for example, chosen from the group consisting of polyvinyl alcohol fibres, aromatic polyamide (or "aramid") fibres, aliphatic polyamide (or "Nylon") fibres, polyester (e.g. PET or PEN), aromatic polyester, cellulose (for example rayon, viscose), polyphenylene benzobisoxazole, polyketone, glass fibres, carbon fibres, ceramic fibres. As a particular preference, notable mention will be made of carbon steel, aramid, polyester, nylon, cellulose, polyketone reinforcing elements and of hybrid reinforcing elements made up of these various materials such as aramid/nylon cords.

The reinforcing elements in the carcass or the reinforcing elements in the circumferential belt may adopt any known shape; they may for example be elementary monofilaments of appreciable diameter (for example and preferably of a diameter greater than or equal to 50 μm), multi filament fibres (made up of a plurality of elementary filaments of small diameter, typically less than 30 μm), folded textile yarns formed of several fibres twisted together, textile or metal cords formed of several fibres or monofilaments cabled or twisted together.

Tires according to an embodiment similar to that of FIG. 2 have been compared against passenger vehicle tires of the prior art.

The size tested was 205/55R16. The flat reinforcing elements 55 in the triangulation layer 5 were of bi-axially stretched PET film 350 μm thick laid at an angle α of 40° and each with a width of 30 mm. The triangulation layer thus formed had a width of 180 mm. The crown belt used an aramid cord. The tire according to the invention thus had a mass of 8 kg, whereas the tire according to the prior art (MICHELIN ENERGY® Saver 205/55R16) had a mass of 6.8 kg, namely 15% higher.

The cornering stiffness, namely the transverse force Fy produced by the tire under a vertical loading Fz of 600 daN when driving with 1° of slip angle. Whereas the tire (MICHELIN ENERGY® Saver 205/55R16) according to the prior art developed 1700 N of transverse force, the tire according to the invention developed 1650 N of transverse force.

It may therefore be seen that the tire according to the invention is appreciably lighter in weight than the tire according to the prior art, with no significant loss of cornering stiffness.

The invention claimed is:

1. A passenger vehicle tire having a crown reinforcement which has three distinct elements, the three distinct elements comprising:
   a radial carcass reinforcement formed of reinforcing elements connecting two beads of the tire;
   a crown belt comprising a first set of belt reinforcing elements parallel to a circumferential direction of the tire; and
   a crown triangulation layer comprising a first set of reinforcing elements making a first angle of between 10 degrees and 80 degrees with the circumferential direction of the tire and a second set of reinforcing elements making a second angle of between 10 degrees and 80 degrees with the circumferential direction of the tire,
   wherein said first and second sets of reinforcing elements of the crown triangulation layer have a flattened cross section and are made of a thermoplastic polymer film that has undergone multi axis stretching, and
   wherein the first and second sets of reinforcing elements are superposed with each other such that the second set of reinforcing elements are elongated along a direction of the first set of reinforcing elements to cover spacing separating the first set of reinforcing elements.

2. The tire according to claim 1, wherein the thermoplastic polymer film is a polyethylene terephthalate (PET) film that has undergone multi axis stretching.

3. The tire according to claim 1, wherein the crown triangulation layer is situated radially on the outside of the crown belt.

4. The tire according to claim 1, wherein the crown triangulation layer is situated radially on the inside of the crown belt.

5. The tire according to claim 1, wherein the first set of belt reinforcing elements of the crown belt has a tensile modulus higher than 25 GPa.

6. The tire according to claim 5, wherein the first set of belt reinforcing elements of the crown belt contains steel.

7. The tire according to claim 5, wherein the first set of belt reinforcing elements of the crown belt contains aramid.

8. The tire according to claim 1, wherein the first set of reinforcing elements of flattened cross section of the crown triangulation layer have a tensile modulus greater than 1 GPa.

9. The tire according to claim 1, wherein spacing between two reinforcing elements of said first set of reinforcing elements of flattened cross section of the crown triangulation layer is greater than sum of their half-widths, the spacing being measured in a direction transverse to the reinforcing elements in the crown triangulation layer.

10. The tire according to claim 1, wherein spacing between two reinforcing elements of said first set of reinforcing elements of flattened cross section of the crown triangulation layer is less than the sum of their half-widths, the spacing being measured in a direction transverse to the reinforcing elements in the crown triangulation layer.

11. The tire according to claim 10, wherein the spacing is less than the sum of their half-widths by a value ("R") that is equal to at least four times their maximum thickness.

12. The tire according to claim 1, wherein the width of the reinforcing elements of said first set of reinforcing elements of flattened cross section of the crown triangulation layer is at least equal to between 5 and 20 times their maximum thickness.

13. The tire according to claim 1, wherein the crown triangulation layer comprises additional reinforcing elements making an angle of between 25 degrees and 60 degrees with the circumferential direction of the tire.

14. The tire according to claim 1, wherein the first set of reinforcing elements and the second set of reinforcing elements in the crown triangulation layer have different lengths and make different angles with the circumferential direction of the tire.

15. The tire according to claim 1, wherein the first angle and the second angle are different.

16. The tire according to claim 1, wherein the reinforcing elements of the second set are separated by spacing.

17. The tire according to claim 1, wherein the reinforcing elements of the second set partially overlap one another.

18. The tire according to claim 1, wherein the crown triangulation layer is interposed between the radial carcass reinforcement and the crown belt.

19. The tire according to claim 1, wherein the crown belt further comprises a second set of belt reinforcing elements parallel to the circumferential direction of the tire, and wherein each belt reinforcing element of the second set corresponds to its respective belt reinforcing element of the first set at a central part of the crown belt.

20. The tire according to claim 1, wherein the tire includes a crown and shoulders, and wherein a width of spacing between two reinforcing elements of said first set of reinforcing elements of flattened cross section of the crown triangulation layer is greater at the middle of the crown than near the shoulders of the tire.

* * * * *